Oct. 9, 1923.

H. H. McNAUGHTON

PULVERIZING MACHINE

Filed Feb. 1, 1922

Inventor
Hart H. McNaughton
By Cyrus Kehr
Attorney

Oct. 9, 1923.
H. H. McNAUGHTON
PULVERIZING MACHINE
Filed Feb. 1, 1922
1,470,177
7 Sheets-Sheet 2
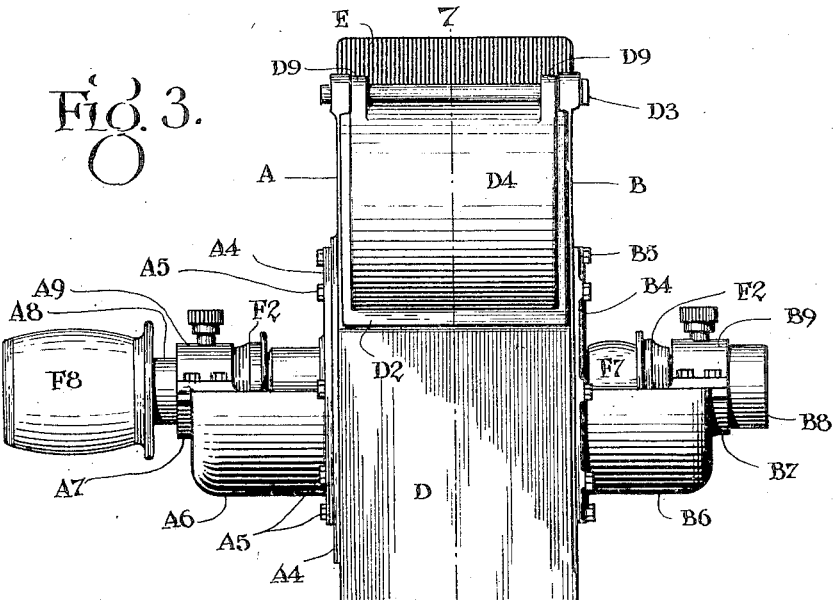
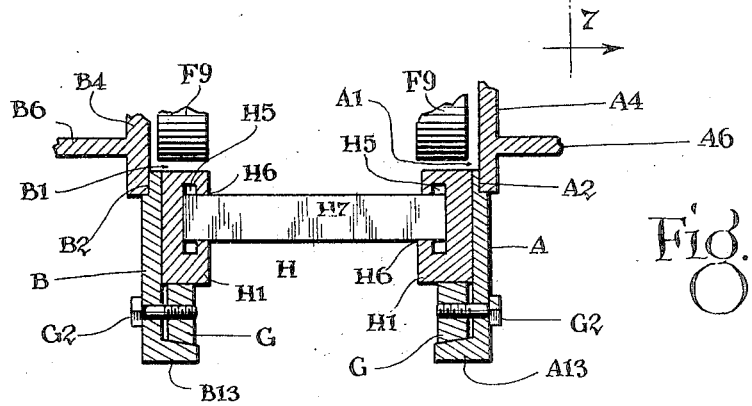
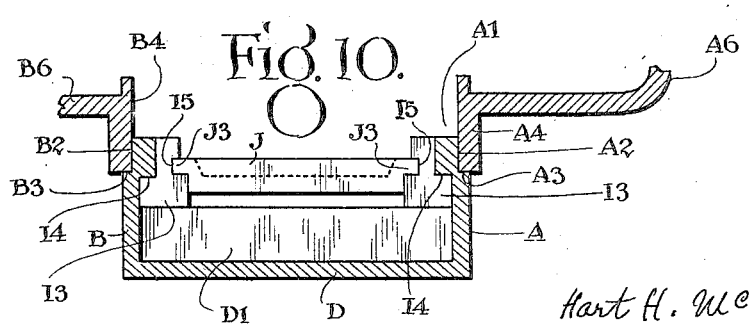
Inventor
Hart H. McNaughton
By Cyrus Kehr
Attorney

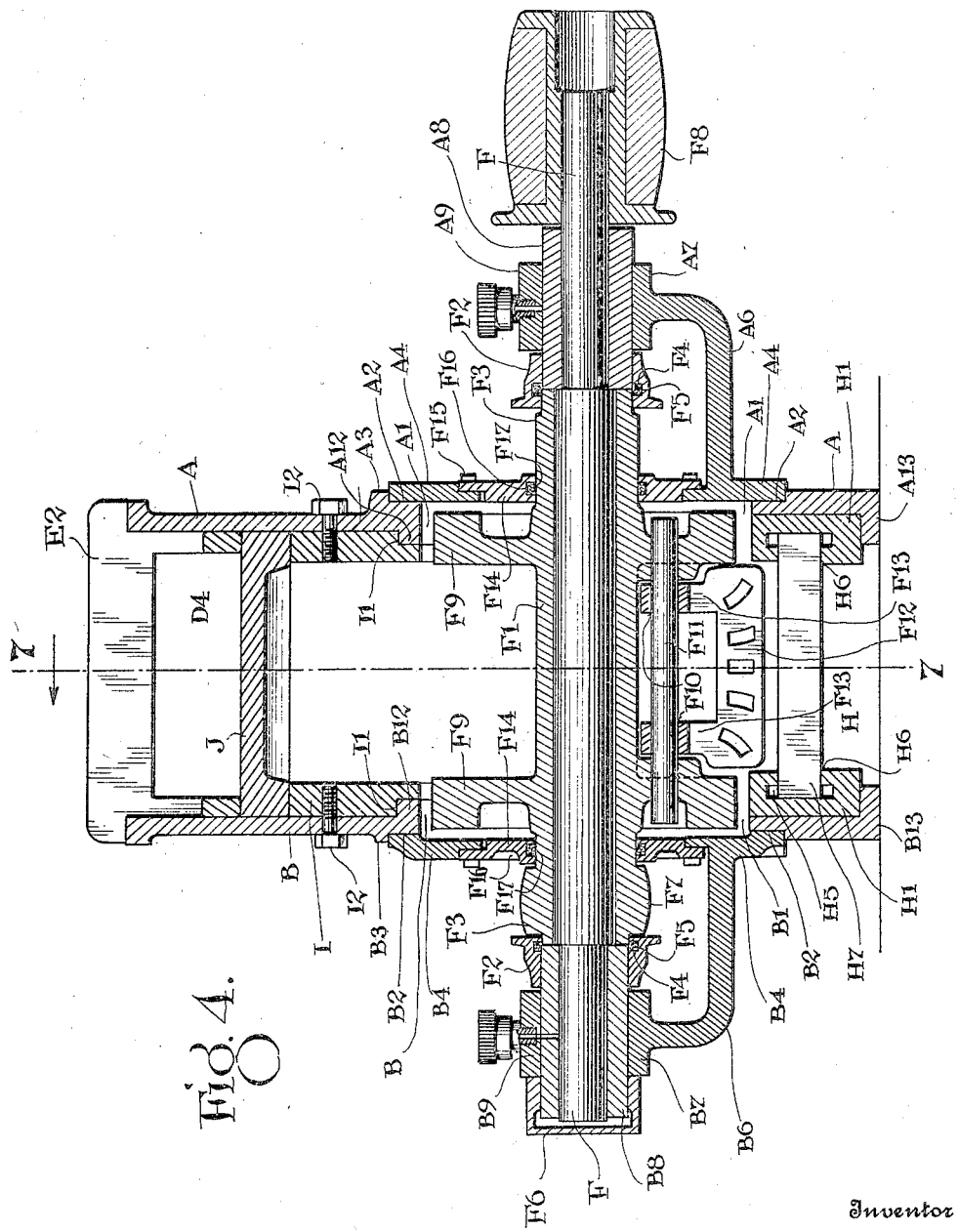

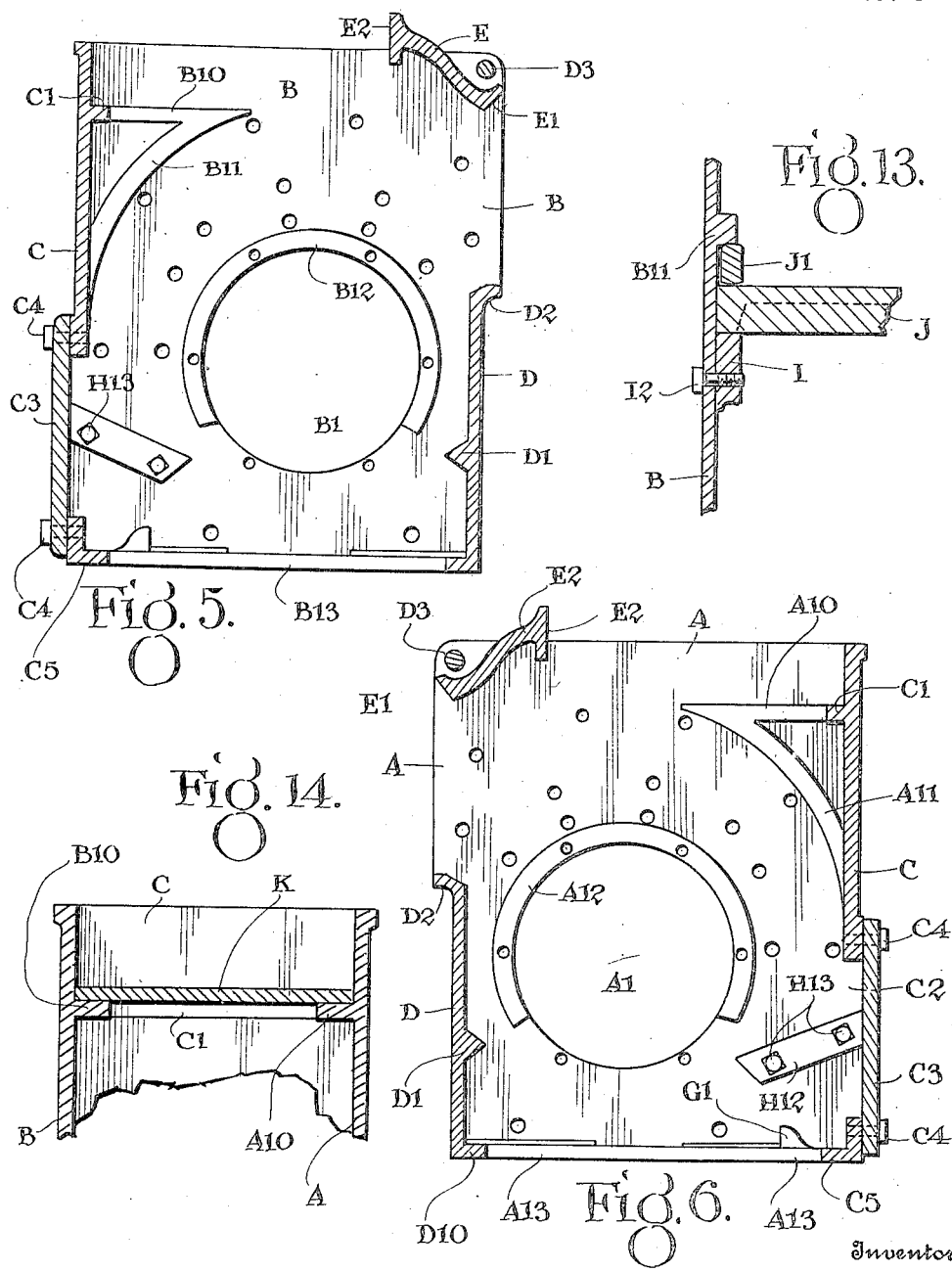

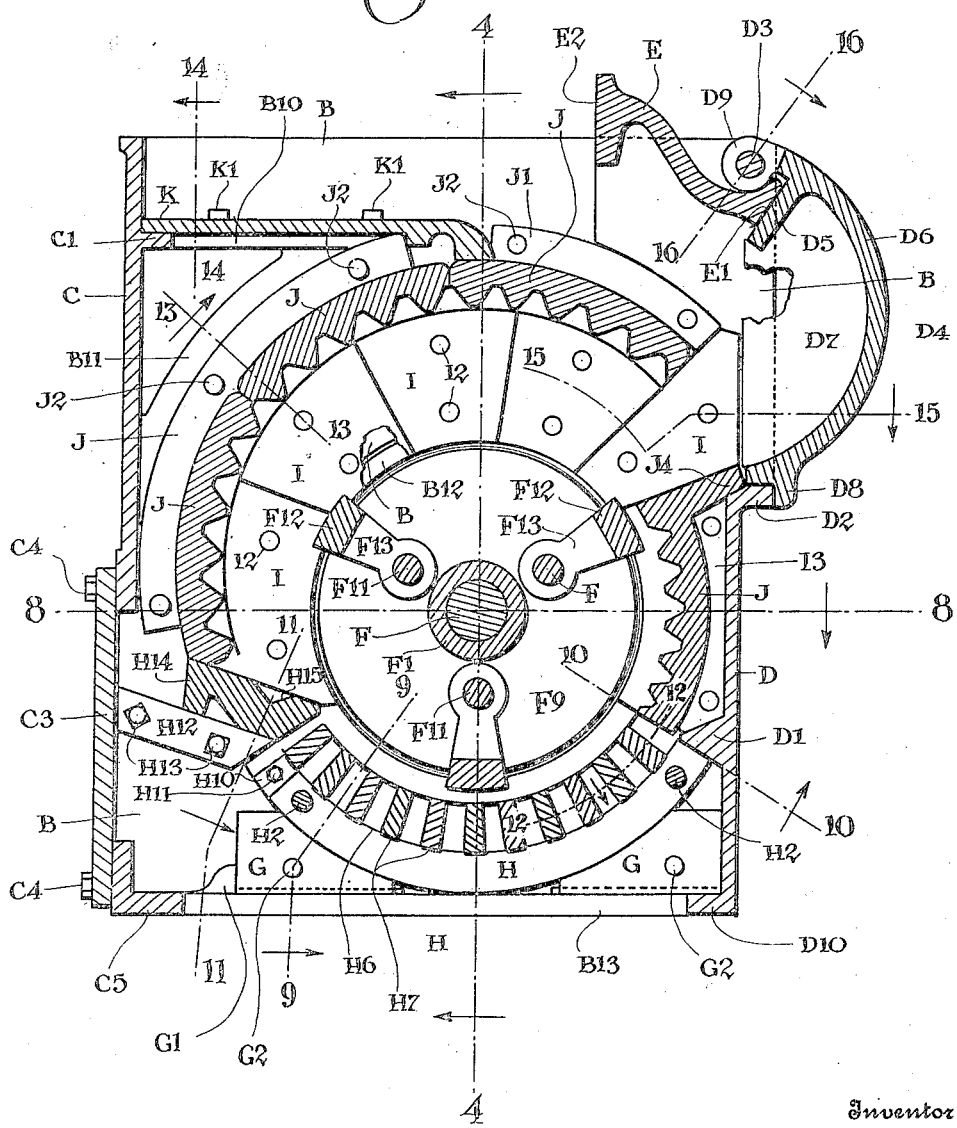

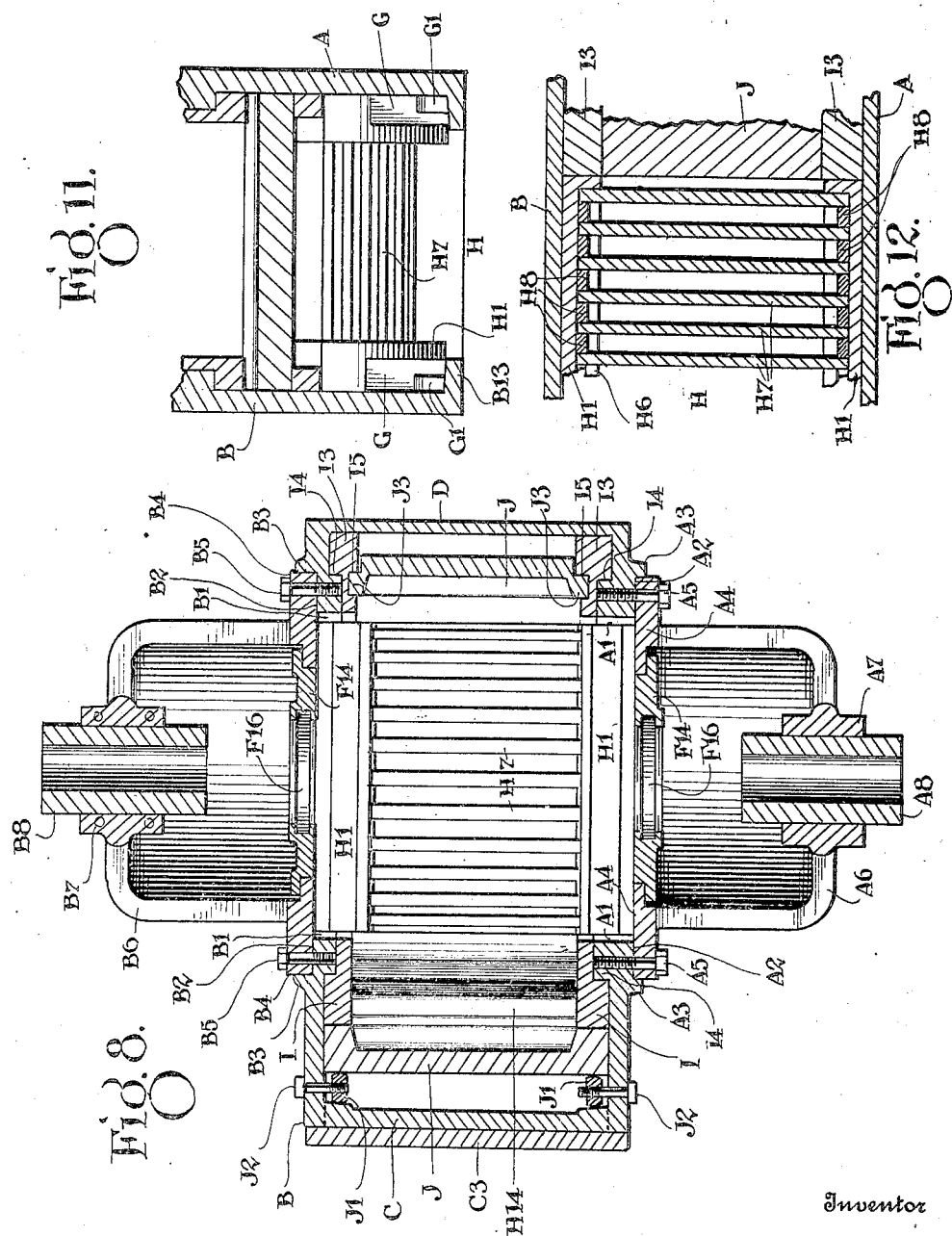

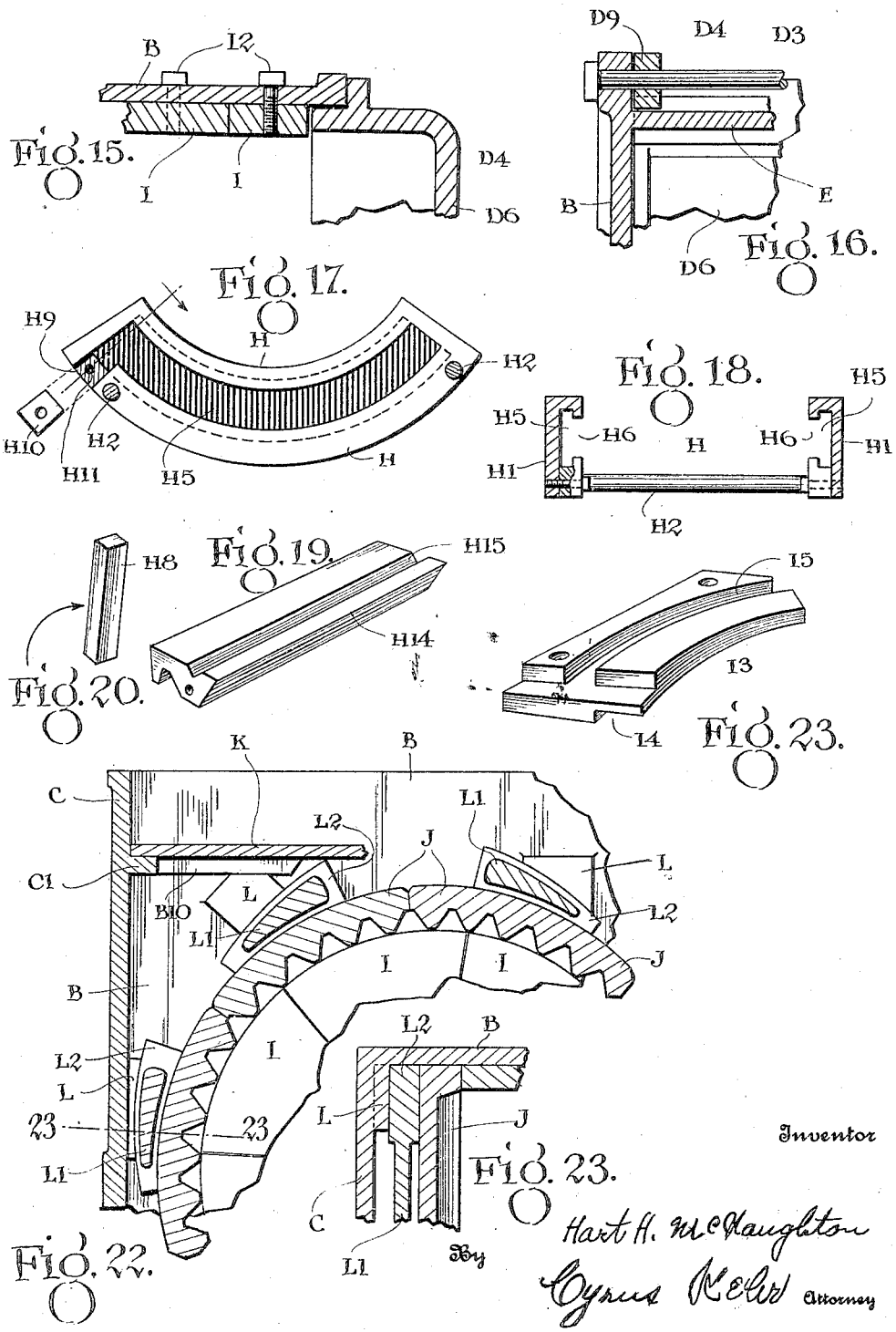

Patented Oct. 9, 1923.

1,470,177

UNITED STATES PATENT OFFICE.

HART H. McNAUGHTON, OF MARYVILLE, TENNESSEE.

PULVERIZING MACHINE.

Application filed February 1, 1922. Serial No. 533,361.

*To all whom it may concern:*

Be it known that I, HART H. MCNAUGHTON, a citizen of the United States, residing at Maryville, in the county of Blount and State of Tennessee, have invented a new and useful Improvement in Pulverizing Machines, of which the following is a specification, reference being had to the accompanying drawing.

My improvement relates particularly to such machines as are used for pulverizing rock by means of centrifugal hammers forming parts of a rotary structure.

The object of the invention is to produce a machine in a form which will permit the use of strong parts cast in complete or so nearly complete form as to require only a limited amount of machining. A further object of the invention is to produce a machine in a compact form which tends toward safety in operation and durability of parts which are subject to deterioration and which permits easy interchange of parts.

In the accompanying drawings,

Fig. 3 is an elevation of the same machine, looking toward the left as shown in Fig. 1;

Fig. 4 is an upright section on the line, 4—4, of Figs. 1, 2, and 7, looking in the direction of the arrow;

Fig. 5 is an upright section, of the body of the machine, on the line, 5—5, of Fig. 2, looking in the direction of the arrow;

Fig. 6 is a similar upright section on the line, 6—6, of Fig. 2, looking in the direction of the arrow;

Fig. 7 is an upright section on the line, 7—7, of Fig. 4, looking toward the left;

Fig. 8 is a horizontal section on the line, 8—8, of Figs. 1 and 7, the rotary structure being omitted;

Fig. 9 is a section on the line, 9—9, of Fig. 7, looking toward the right;

Fig. 10 is a section on the line, 10—10, of Fig. 7, looking in the direction of the arrow;

Fig. 11 is a section on the line, 11—11, of Fig. 7, looking in the direction of the arrow;

Fig. 12 is a section on the line, 12—12, of Fig. 7, looking in the direction of the arrow;

Fig. 13 is a section on the line, 13—13, of Fig. 7, looking in the direction of the arrow;

Fig. 14 is an upright section on the line 14—14, of Fig. 7, looking toward the left;

Fig. 15 is a horizontal section on the line, 15—15, of Fig. 7;

Fig. 16 is a section on the line, 16—16, of Fig. 7, looking in the direction of the arrow;

Figs. 17 and 18 are detail views of the grating frame;

Fig. 19 is a detail view of the key block used for holding the grating frame;

Fig. 20 is a perspective of one of the screen bar spacing keys;

Fig. 21 is a perspective of one of the lining plates used in the left hand part of the machine;

Fig. 22 shows another means for securing the grinding plates;

Fig. 23 is a section on the line, 23—23, of Fig. 22.

The body of the machine is of box form comprising four upright walls which are substantially rectangular, and said body is preferably a one-piece casting.

Figure 1:
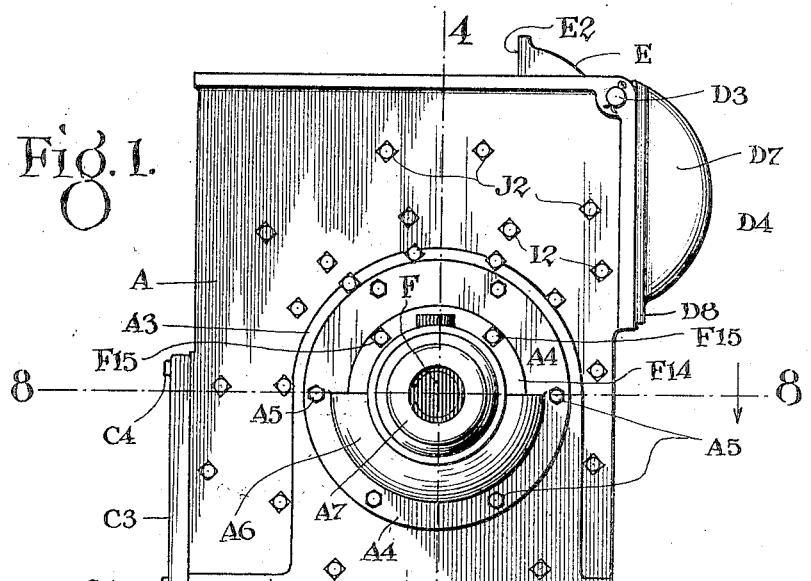
Fig. 1 is an elevation of a machine embodying my improvement, the view being parallel to the axis of the machine.
Figure 2:
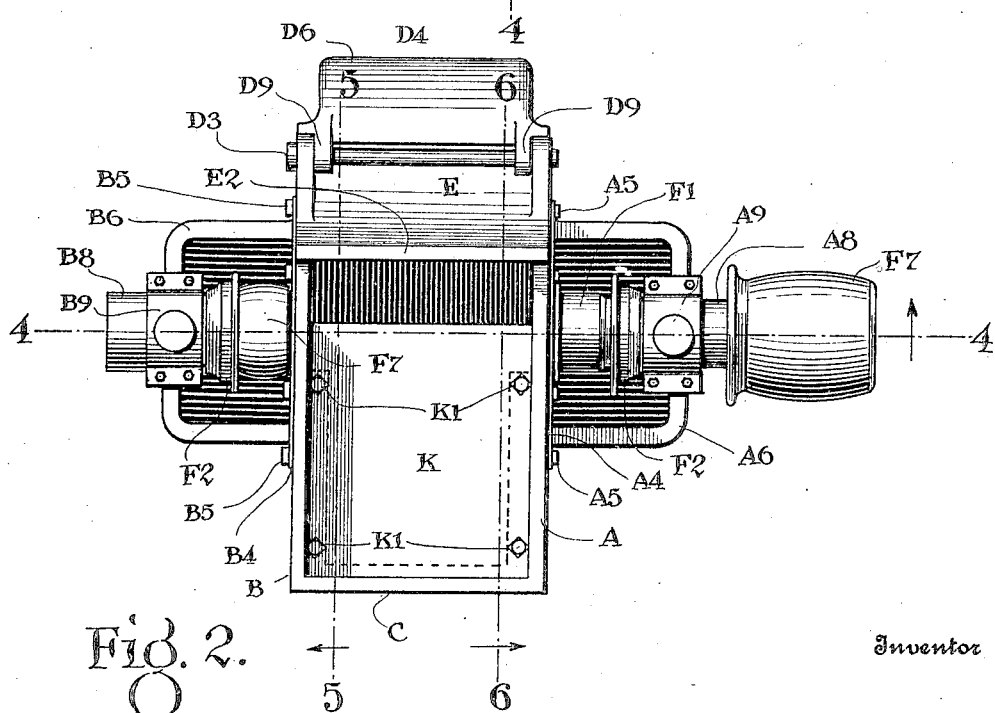
Fig. 2 is a plan of the same machine.

For convenience in description, the side of the machine shown in Fig. 1 will be regarded as the front of the machine.

The front wall, A, and the rear wall, B, are alike in reverse. C is the left hand end wall and D is the right hand end wall.

The front wall, A, has a circular opening, $A^1$, and the rear wall, B, has a circular opening, $B^1$. The centers of said openings are on the same horizontal axial line and are of the same diameter. Around the opening, $A^1$, and on the exterior of the wall, A, is a machined face, $A^2$, around which is a ring-form rib, $A^3$. A ring-form plate, $A^4$, rests against said machined face and is secured to the wall, A, by means of bolts or cap screws, $A^5$. On the lower part of said ring is a bracket, $A^6$, reaching outward horizontally away from the plate, $A^4$, and then extending upward. The upper part of said bracket forms the lower half, $A^7$, of a bearing to receive a bearing sleeve, $A^8$. A bearing cap, $A^9$, extends across the upper part of the sleeve, $A^8$, and is secured to the member, $A^7$. At the rear of the machine, a face, $B^2$, is similarly machined along the circumference of the opening, $B^1$, and a ring-form rib, $B^3$, is formed on the wall, B, around said face. A ring-form plate, $B^4$, is applied to said face and secured by bolts or cap screws, $B^5$. Said ring-form plate has a bracket, $B^6$, the rear part of which is extended upward and forms the lower part, $B^7$, of a bearing for the bearing sleeve, $B^8$. A bearing cap, $B^9$, extends across the upper part of the bearing sleeve and is secured to the lower bearing member, $B^7$.

A flange, $C^1$, extends horizontally along the inner face of the wall, C, near the upper edge of said wall. At the same level, a similar flange, $A^{10}$, extends from the flange, $C^1$, toward the right along the inner face of the wall, A, nearly to the middle of the width of the wall, A. A similar flange, $A^{11}$, extends along the inner face of the wall, A, from the right hand end of the flange, $A^{10}$, downward to the wall, C, on a curve which has its center a little way above the axis of the opening, $A^1$, in the wall, A. A similar flange, $A^{12}$, extends inward from the inner face of the wall, A, along the upper half of said opening, $A^1$, and a short distance below the horizontal middle line of said opening. Along the lower edge of the wall, A, is an inward-directed flange, $A^{13}$.

On the inner face of the wall, B, are flanges $B^{10}$, $B^{11}$, $B^{12}$ and $B^{13}$, directly opposite and corresponding to the flanges, $A^{10}$, $A^{11}$, $A^{12}$ and $A^{13}$, on the wall, A.

In the lower part of the wall, C, is an opening, $C^2$. A door or closure, $C^3$, is applied over the opening, $C^2$, on the outer face of the wall, C, and is secured by cap screws, $C^4$. Along the lower edge of the wall, C, is an inward-directed flange $C^5$.

On the lower part of the inner face of the wall, D, is a rib or shoulder, $D^1$, which serves as an abutment and support, as will be described further on. Along the lower edge of the wall, D, is an inward-directed flange, $D^{10}$. The wall, D, extends upward only a little above the middle of the height of the walls, A and B, and the upper part of said wall has a flange, $D^2$, extended toward the right, and the parts of the wall, A and B, above said flange extend to the right hand limit of said flange.

A horizontal shaft, $D^3$, has its front end seated in the front wall, A, near the upper right hand corner of said wall and has its rear end seated similarly in the right hand upper corner of the rear wall, B. Below said shaft a wall, E, extends horizontally across the space between the walls, A and B, and is joined to said walls, being preferably cast integral with said walls. The wall, E, is far enough away from the shaft, $D^3$, to make room for hinging the throat door, $D^4$. The right hand edge of the wall, E, is expanded to form an inclined face, $E^1$, which is overlapped by a flange, $D^5$, extending obliquely toward the left and downward on the inner face of said door. The left hand upper part of the wall, E, is met by an upright wall, $E^2$, which extends from the wall, A, to the wall, B, to form a throat wall. The right hand or main wall, $D^6$, of said door is curved downward toward the right to extend the throat of the machine in that direction, and said wall extends from the shaft, $D^3$, downward to and above the flange, $D^2$. The door has front and rear upright walls, $D^7$, joined to the curved wall, $D^6$, and the flange, $D^5$, and extending to the left far enough to overlap a part of the inner faces of the walls, A and B. A flange, $D^8$, on the lower part of the door overlaps the right hand edge of the flange, $D^2$, and extends upward on the front and rear faces of said door and overlaps the adjacent upright edges of the walls, A and B. At each upper corner said door has an ear, $D^9$, surrounding the shaft, $D^3$. Thus said door is supported by and made turnable on said shaft. The upper part of the outer face of the door and the upper face of the wall, E, adjacent the shaft, $D^3$, are so curved as to permit the turning of the door upward, contra-clockwise, until the greater part of said door has passed the upright plane of said shaft and the outer face of the door rests upon the upper face of the wall, E. Said door affords access to the adjacent part of the interior of the machine.

The bearing sleeves, $A^8$ and $B^8$, receive the axle, F, of the rotary structure. Said axle is surrounded by a hub, $F^1$, which extends from the bearing sleeve, $A^8$, to the bearing sleeve, $B^8$. The inner end of each of said bearing sleeves is surrounded by an abutment ring, $F^2$, which abuts against the adjacent bearing, $A^7$, $A^9$ or $B^7$, $B^9$, and meets a shoulder, $F^3$, on said hub. By means of said abutment ring, the rotary structure is held against endwise movement. Along the joint formed at the meeting of the bearing sleeves and the hub, the inner faces of the rings, $F^2$, are provided with channels, $F^4$, in which is packing, $F^5$, which is intended to prevent the escape of oil and the admission of dust into the bearing sleeves. The rear end of the bearing sleeve, $B^8$, and the adjacent end of the axles, F, are covered by a cap, $F^6$, which is suitably secured to the exterior of said sleeve. The function of said cap is to exclude dust and to prevent the escape of oil.

Between the rear abutment ring, $F^2$, and the adjacent wall of the machine, said hub is thickened to form a pulley, $F^7$, which may receive a belt to be driven by said pulley and connected with a conveyor for carrying the pulverized material away from the machine. At the front of the machine, the axle, F, extends forward through the bearing sleeve, $A^8$, and receives a larger pulley, $F^8$, which is to receive a driving belt whereby said pulley and the axle, F, are rotated. Between the ring-form plates, $A^4$ and $B^4$, wheels, $F^9$, are formed on the hub, $F^1$, the diameter of said wheels being nearly the same as the diameter of the openings, $A^1$ and $B^1$, in the walls, A and B; and since the plates, $A^4$ and $B^4$, are set over the outer faces of the walls, A and B, said wheels extend into said openings, $A^1$ and $B^1$. Lining plates, I, to be described further on are applied to the inner faces of the walls, A and B, and are of sufficient thickness to extend inward as far as the wheels, $F^9$, extend inward. Thus the walls, A and B, and said lining plates form chambers or recesses occupied by said wheels, so that said wheels are not in the main part of the interior of the machine. The peripheries of each of said wheels is approximately as thick as the thickness of the adjacent wall plus the thickness of the adjacent lining plate. Between said peripheries and the hub are horizontal bearings, $F^{10}$, on lines parallel to the axle, F. Shafts, $F^{11}$, rest in said bearings and support hammers, $F^{12}$, said hammers having arms, $F^{13}$, through which said shaft extends. Said arms, $F^{13}$, are of such length as to allow the body of the hammer to extend outward away from the axis of the shaft, F, beyond the peripheries of the wheels, $F^9$. Said hammers are of the well known centrifugal type and made of any desired form.

The space between each ring-form plate, $A^4$ and $B^4$, and the hub is closed by a divided ring, $F^{14}$, each such ring consisting of two halves and having its outer edges overlapping the inner edges of the ring-form plates, $A^4$ and $B^4$, and secured thereto by bolts or screws, $F^{15}$. At their inner edges the plates, $F^{14}$, have a channel, $F^{16}$, in which is packing, $F^{17}$, the function of which is to prevent the escape of pulverized material from the interior of the machine.

The four lower flanges, $A^{13}$, $B^{13}$, $C^5$ and $D^{10}$, serve to form a base for the body of the machine and may be used for attaching the lower part of a conveyor structure. Furthermore, the flanges, $A^{13}$ and $B^{13}$, serve to support blocks, G, which form a seat for the screen frame, H. The right hand ends of the right end blocks abut against the wall, D. The left hand edges of the blocks, G, abut against a shoulder, $G^1$, formed on the inner face of the adjacent wall, A, or the adjacent wall, B. The upper faces of the parts of the flanges on which said blocks rest are inclined away from the adjacent walls. Cap bolts, $G^2$, extend horizontally through said blocks and engage the adjacent upright wall. By drawing said blocks toward said walls, said blocks are forced upward. The upper edges of said blocks are curved to conform to the curved side members of the screen frame and said members rest on said curved faces of said blocks. Hence tightening of said bolts will cause said blocks to press upward against the side members of the screen frame. The screen frame, H, is concentric with the axle, F, of the machine. The main parts of the screen frame are the curved side members, $H^1$, and the cross bars, $H^2$, extending across the spaces between the side members, $H^1$, near the ends of the latter, whereby a rectangular frame is formed, the ends being straight and the sides curved. The ends of said bars extend through the side members below the slot, $H^6$, and the chamber, $H^5$, in order that there may be clear space for the screen bars, and the ends of said cross bars are rigidly secured to said side members. The forward side member, $H^1$, bears against the inner face of the wall, A, and the rear side member, $H^1$, bears against the inner face of the rear wall, B. The right hand ends of the side members bear against the abutment rib, $D^1$, and against the adjacent rib, $A^{12}$ or $B^{12}$, whereby the screen frame is prevented from moving toward the right. The left hand ends of the side members, H, bear against the left hand ends of the ribs, $A^{12}$ and $B^{12}$, whereby leftward movement of the frame is prevented.

Each side member, $H^1$, of the screen frame has a longitudinal upright chamber, $H^5$; and in each inner wall each of said members has a longitudinal slot, $H^6$, connecting said chamber with the exterior. The screen bars, $H^7$, extend from one of the members, $H^1$, to the other and have their ends extending through the slots, $H^6$, into the chamber, $H^5$. Said bars are flat and are set edgewise and spaced from each other by spacing keys, $H^8$, set upright between the bars in the chambers, $H^5$. The upright dimensions of the bars nearly equal the corresponding dimensions of the slots, $H^6$. For the insertion of the bars and the spacing keys, a slot, $H^9$, is extended downward from the left hand end of the chambers, $H^5$, and from the slot, $H^6$, to and through the lower face of the member, $H^1$. For assembling the parts, a bar, $H^7$, is lifted upward through the slots, $H^9$, and then moved rightward in the slots, $H^6$. Then a spacing key, $H^8$, is moved upward through each slot, $H^9$, and moved to the right and placed against said bar. Then another bar and other keys are similarly entered until all the bars and keys are in place. Then a retaining block, $H^{10}$, is put into the slot, $H^9$, and secured by a bolt, $H^{11}$.

It will be observed that the bars, $H^7$, and the spacing keys, $H^8$, are held securely in their places, the bars being held against movement up and down and also against endwise movement, and the spacing keys being longer than the slots, $H^6$, and therefore restrained from movement out of the chambers, $H^5$.

The upper faces of the members, $H^1$, are even with the adjacent edges of the walls, A and B, at the openings, $A^1$ and $B^1$, the ribs, $A^{12}$ and $B^{12}$, being absent along this part of the openings, $A^1$ and $B^1$.

At the left of the screen frame, an inclined bar, $H^{12}$, is secured to each wall, A and B, by means of bolts, $H^{13}$, the ends of these bars meeting the ends of the side members of the screen frame. A key block or plate, $H^{14}$, extends from the wall, A, to the wall, B, and has its ends resting on the bars, $H^{12}$, and also bears against the adjacent ends of the side members, $H^1$, of the screen frame. Said key plate also serves as a lower grinding plate, a part of the upper face of said plate being exposed for impact by the material which is being pulverized. Said exposed face is preferably ribbed or channeled as shown at, $H^{15}$.

Keeping in mind that the ends of the key plate, $H^{14}$, reach to the inner faces of the wall, A and B, it is next to be noted that a lining plate, I, is placed against the inner face of each wall, A and B, next above the key plate, $H^{14}$, and extending from the openings, $A^1$ or $B^1$, outward to the inner face of the adjacent concave grinding plate, J. The inner edge of said lining plate, I, has a channel, $I^1$, to receive the adjacent rib, $A^{12}$ or $B^{12}$, (see Fig. 4). The lining plate, I, is secured to the adjacent wall by means of cap bolts, $I^2$ extending through the wall into said plate. Next above said plate, I, is a similar plate, I, also reaching from the adjacent openings, $A^1$ or $B^1$, to the adjacent concave grinding plates, J, and said lining plate is similarly secured by cap bolts. At the right of the last lining plate is another similar lining plate similarly secured and at the right of the last mentioned lining plate is another such plate reaching past the right hand edge of the adjacent grinding plate, J, and rightward to the edge of the door, $D^6$, and downward to the left hand grinding plate, J. Below the last lining plate, I, is another lining plate, $I^3$, (see Figs. 7 and 21).

The grinding plates, J, between the key plate, $A^{14}$, and the throat of the machine reach from the inner face of the wall, A, to the inner face of the wall, B, and have their inner faces bearing against the outer edges of the lining plates, I. The dimensions of the said parts are such as to leave a space between the convex outer faces of the grinding plates, J, and the adjacent rib, $A^{11}$ or $B^{11}$. Into each of those spaces a segment key, $J^1$, is placed and secured therein by bolts, $J^2$. Said segment keys are tapering in cross section, so that drawing said keys toward the adjacent wall will wedge said keys into said space, whereby the grinding plates are pressed firmly against the outer edges of the lining plates, I. Another segmental key is similarly placed rightward of the ribs, $A^{11}$ and $B^{11}$.

Each lining plate, $I^3$, also overlaps the adjacent rib, $A^{12}$ or $B^{12}$, and bears with its lower end on the rib, $D^1$, and has a channel, $I^4$, to receive said rib. And the inner face of each of said plates, $I^3$, has a channel, $I^5$, to receive a tongue, $J^3$, formed on the ends of the adjacent grinding plate, J. At its upper edge said lining plate, J, has a flange, $J^4$, extended toward the right to overlap the part of the flange, $D^2$, of the wall, D, which is not covered by the door, $D^6$. And the lining plate, $I^3$, is also secured by bolts, $I^2$.

A horizontal lid, K, rests on the flanges, $C^1$, $A^{10}$ and $B^{10}$, and reaches to the walls, A, B and C, and extends to the right approximately to the upright plane of the axle, F, and is there turned downward to meet the upper face of the adjacent grinding plate, J. Cap bolts, $K^1$, extend through said lid and the adjacent flanges, $A^{10}$ or $B^{10}$.

Said lid may be removed after removing said cap bolts. The grinding plates between the key plate, $H^{14}$, and the throat of the machine may be removed after removing the segment keys, $J^2$. Then the lining plates upon which said grinding plates bore may be removed after loosening the bolts, $I^2$. The grinding plate, J, at the left of the machine may be removed after the lining plates immediately above said grinding plate have also been removed, said left hand grinding plate being lifted out of the channels, $I^5$. Then the lining plates, $I^3$, may be removed after removing the bolts, $I^2$, from said plates.

To attain access to the spaces above the screen frame for cleaning out said spaces, the door, $C^3$, is removed and then the key plate, $H^{14}$, is drawn rightward through the door opening. Then the attendant may reach through the space between the left hand part of the screen frame and the lower edge of the left hand grinding plate, J.

For removing the screen frame, the ribs, $H^{12}$, and the left hand supporting blocks, G, are also removed. Then the left hand part of the screen frame is to be slightly lowered to clear the ribs, $A^{12}$ and $B^{12}$, and the frame is then to be drawn leftward through the door opening.

Figs. 22 and 23 illustrate another means for securing the concave grinding plates, J. In this form, the flanges, $A^{11}$ and $B^{11}$, are omitted from the walls, A and B, and lugs, L, are placed on said walls near the outer faces of the grinding plates, J, one such lug being opposite each plate on each end wall. For each such plate there is a wedge bar, L, which has at each end a wedge-shape head, $L^2$, adapted to engage by wedge action between the adjacent grinding plate and the adjacent lug, L. For releasing the grinding plates, these wedge heads are to be hit at the lower ends with a hammer or similar means.

The grinding plates and the grate bars are to be made of metal which is best adapted to good service for this kind of work, and said members are to be tempered to make them durable. It will be desirable to temper both edge faces of the grate bars to make them hard, while the body is of ordinary temper and strong. If both edge faces are thus hardened, the bars may be reversed after one edge has been worn by use.

I claim as my invention,

1. In a machine of the kind described, the combination with a body having upright walls and a rotary structure supported by said walls and comprising centrifugal hammers, of a screen frame and grate bars below the rotary structure, upright lining plates located between the screen frame and the throat of the machine and having their inner faces channeled, and a grinding plate having its ends resting in said channels and against the adjacent end of the screen frame, substantially as described.

2. In a machine of the kind described, the combination of a body having upright walls and a rotary structure supported by said walls and comprising centrifugal hammers, the walls which support the rotary structure having openings into which the rotary structure extends and said supporting walls having on their inner faces a flange concentric to the axis of the rotary structure and bordering said opening, lining plates supported on the inner faces of said walls and fitted to said flange, and concave grinding plates, substantially as described.

3. In a machine of the kind described, the combination with a one-piece cast body having upright walls and a rotary structure supported by said walls and comprising centrifugal hammers, of a screen frame and grate bars below the rotary structure, lining plates on the inner faces of the end walls, concave grinding plates having their ends supported by the lining plates, and key members engaging the outer faces of the grinding plates, substantially as described.

4. In a machine of the kind described, the combination with a one-piece cast body having upright walls and a rotary structure supported by said walls and comprising centrifugal hammers, of a screen frame and grate bars below the rotary structure, upright lining plates located between the screen frame and the throat of the machine and having their inner faces channeled, and a grinding plate having its ends resting in said channels and against the adjacent end of the screen frame, substantially as described.

5. In a machine of the kind described, the combination of a body having upright walls and an abutment on the inner face of one of the cross walls, an endwise removable screen frame in the lower part of said body and having one end bearing against said abutment and removable means bearing against the other end of the screen frame, grate bars in said frame and a rotary structure comprising centrifugal hammers, substantially as described.

6. In a machine of the kind described, the combination with a body having upright walls and an abutment on the inner face of one of the cross walls, a screen frame in the lower part of said body and having one end bearing against said abutment and removable means bearing against the other end of the screen frame, a removable key member at the opposite end of the screen frame, removable supports for said key member, and removable supports under the screen frame, substantially as described.

7. In a machine of the kind described, the combination with the body of the machine and a rotary structure supported by the body, of a screen structure located below the rotary structure and comprising screen bars and spacing keys and side members having slots to receive the ends of the screen bars and said side members being chambered larger than said slots to receive the key members, and the side members having lower openings to said channels and chambers for the insertion of said bars and said spacing keys, substantially as described.

In testimony whereof I have signed my name, this 30th day of January, in the year one thousand nine hundred and twenty-two.

HART H. McNAUGHTON.